(12) United States Patent
Lewin et al.

(10) Patent No.: US 6,241,489 B1
(45) Date of Patent: Jun. 5, 2001

(54) INTERNAL ELECTRICAL CONNECTOR FOR A HYDRAULIC CONTROL UNIT

(75) Inventors: Douglas Lewin, Cement City; Paolo Rea, Dearborn; James Cossins, Taylor, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/415,425

(22) Filed: Oct. 8, 1999

(51) Int. Cl.[7] .......................... F04B 17/00; H01R 17/04; H01R 13/428
(52) U.S. Cl. ..................... 417/410.1; 439/675; 439/744
(58) Field of Search ................ 417/410.1, 423.1; 439/675, 744, 746, 76.1; 303/119.2, 119.3

(56) References Cited

U.S. PATENT DOCUMENTS

| | | | |
|---|---|---|---|
| 5,064,389 | * 11/1991 | Klein et al. | 439/746 |
| 5,137,455 | * 8/1992 | Moerbe et al. | 439/34 |
| 5,275,478 | 1/1994 | Schmitt et al. | 303/119.2 |
| 5,326,235 | 7/1994 | Bruhn | 417/410.1 |
| 5,407,260 | 4/1995 | Isshiki et al. | 303/119.3 |
| 5,449,226 | 9/1995 | Fujita et al. | 303/116.4 |
| 5,452,948 | 9/1995 | Cooper et al. | 303/119.3 |
| 5,466,055 | 11/1995 | Schmitt et al. | 303/119.3 |
| 5,957,547 | 9/1999 | Schliebe et al. | 303/119.3 |
| 5,992,946 | * 11/1999 | Bayer et al. | 303/119.3 |
| 6,059,381 | * 5/2000 | Bayer | 303/119.3 |

FOREIGN PATENT DOCUMENTS

| | | |
|---|---|---|
| 0 645 875 B1 | 3/1995 | (EP) . |
| WO 95/21758 A1 | 8/1995 | (WO) . |

* cited by examiner

Primary Examiner—Timothy S. Thorpe
Assistant Examiner—Michael K. Gray
(74) Attorney, Agent, or Firm—MacMillan, Sobanski & Todd, LLC (57) ABSTRACT

An internal electrical connector includes at least one electrical conductor overmolded by a body formed from an electrically non-conducting material. The connector is received by a bore extending through a valve body for an anti-lock brake system hydraulic control unit. An electronic control unit mounted upon a first surface of the valve body is electrically connected to one end of the connector while the other end of the connector is electrically connected to a pump motor mounted upon a valve body surface opposite from the electronic control unit. The connector is free to move both transversely and axially within the valve body bore to compensate for component tolerance stack up.

28 Claims, 5 Drawing Sheets

FIG. 1

PRIOR ART

INTERNAL ELECTRICAL CONNECTOR FOR A HYDRAULIC CONTROL UNIT

BACKGROUND OF THE INVENTION

This invention relates in general to hydraulic control units for anti-lock brake systems and in particular to an internal electrical connector for a hydraulic control unit.

An Anti-lock Brake System (ABS) is often included as standard or optional equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. Typically, the pump is mounted within the control valve body and the pump motor is attached to a side of the valve body. An ABS further includes an electronic control module which is electrically connected to the pump motor, a plurality of solenoid coils associated with the solenoid valves, and wheel speed sensors for monitoring the speed and deceleration of the controlled wheels. The electronic control module is typically mounted directly upon the control valve body. The assembled valve body, pump motor and electronic control module form a compact unit which is often referred to as an ABS hydraulic control unit.

During vehicle operation, the ABS electronic control module continuously receives speed signals from the wheel speed sensors. The control module monitors the speed signals for potential wheel lock-up conditions. When the vehicle brakes are applied and electronic components within the control module sense an impending wheel lock-up condition, the control module is operative to actuate the pump motor and selectively operate the solenoid valves to cyclically relieve and reapply hydraulic pressure to the controlled wheel brakes. The hydraulic pressure applied to the controlled brakes is adjusted by the operation of the solenoid valves to limit wheel slippage to a safe level while continuing to produce adequate brake torque to decelerate the vehicle as desired by the driver.

Figure 1:
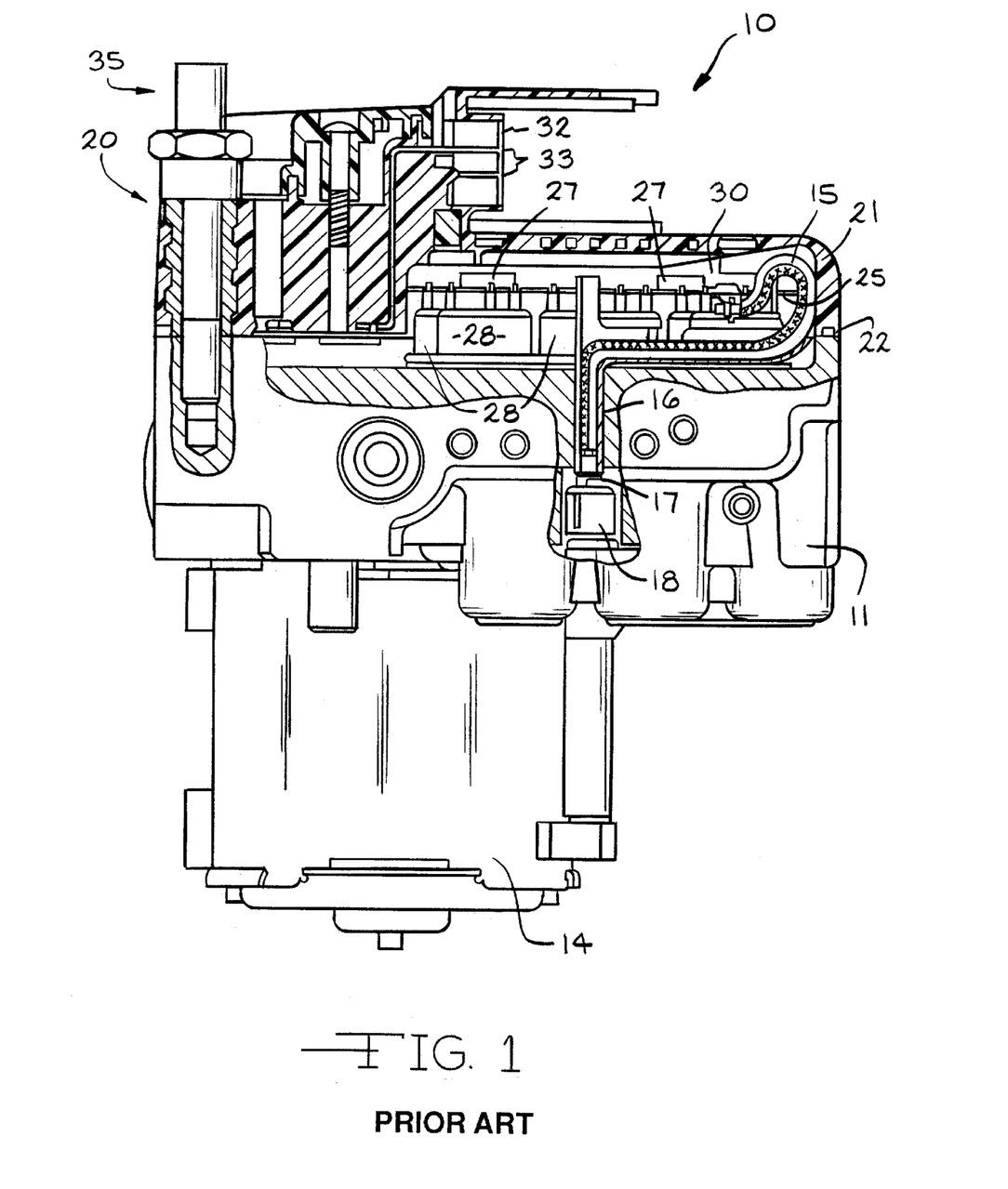
FIG 1. is an exploded view of an ABS hydraulic control unit in accordance with the prior art.

Referring now to FIG. 1, there is shown an exploded perspective view of a typical prior art ABS hydraulic control unit 10. For simplicity, hydraulic fittings for connecting the control unit 10 to vehicle brake components have been omitted from FIG. 1. The hydraulic control unit 10 includes a control valve body 11. As described above, a plurality of solenoid valves (not shown) and a pump (not shown) are mounted within the control valve body 11. A plurality of valve sleeves (not shown), which are associated with the solenoid valves, extend upwardly from the top surface of the valve body 11. Seals are formed between the valve sleeves and the valve body 11 to prevent loss of hydraulic fluid from the vehicle brake system. Each of the valve sleeves encloses an axially movable solenoid armature (not shown) which carries a valve ball on one end.

A pump motor 14 is mounted upon the bottom of the valve body 11. The pump motor 14 has a shaft (not shown) that extends into the valve body 11 to drive a pump. The motor 14 receives electrical power through wires contained in a flexible pigtail 15. The pigtail 15 extends through a vertical bore 16 that is formed through the valve body 11. The lower end of the pigtail 15 terminates in an electrical connector 17 that is attached to a corresponding electrical connector 18 for the motor 14.

A removable electronic control module 20 is attached to the top surface of the valve body 11. The control module 20 includes a box-shaped housing 21 having an open bottom. A seal 22 is disposed between the housing 21 and the valve body 11 to prevent contamination of the interior of the module 20. The housing 21 can be cast from an aluminum alloy or injection molded from a plastic.

A Printed Circuit Board (PCB) 25 is disposed within the control module housing 21. Electrical traces (not shown) are deposited upon the top surface of the PCB 25 by a conventional method. The electrical traces connect electronic components 27 that are mounted upon the PCB 25. The electronic components 27, which include control logic and switching elements for the solenoid valves and motor, are mounted upon the upper surface of the PCB 25. A plurality of solenoid coils 28 for actuating the solenoid valves are mounted upon the lower surface of the PCB 25. When the control module 20 is attached to the valve body 11, each of the valve sleeves extends through an associated solenoid coil 28. When an electric current passes through a solenoid coil 28, a magnetic field is created which causes the armature in the associated valve sleeve to shift and actuate the valve.

An electrical connector 30 is mounted upon the PCB 25 and has an end portion that receives the upper end of the motor pigtail 15. As shown in FIG. 1, the upper end of the pigtail 15 is secured to the connector 30. the electrical connector 30 is, in turn, connected to the control circuit components 27 by the electrical traces. An electrical socket 32 is formed in the control module housing 21. The socket 32 includes a plurality of electrical connectors 33 that are electrically connected to the traces deposited upon the PCB 25. the socket 32 provides an interface with the wheel speed sensors and vehicle power supply.

Typically, a plurality of threaded fasteners 35 attach the electronic control module 20 to the valve body 11. The structure of the control module 20 allows its removal from the valve body 11 for service of the electrical and electronic components without opening the hydraulic brake lines of the vehicle.

SUMMARY OF THE INVENTION

This invention relates to an internal electrical connector for an ABS hydraulic control unit.

As described above, prior art ABS hydraulic control units typically include a motor driven pump. The pump is mounted externally upon the control valve body and receives power from an electronic control module through an external pigtail connector. The pigtail connector requires additional wire, which is expensive. Also, the wire, being external to the control valve, is exposed to the operating environment, which can be harsh. Additionally, maintenance personnel have been known to use the pigtail as a carrying handle, which can damage the electrical connections. Accordingly, it would be desirable to eliminate the external pigtail connector for the pump motor. Additionally, it also would be desirable to reduce the overall size of the hydraulic control unit by relocating the motor from the side of the control valve body. However, any electrical connector between the motor and electronic control module must accommodate the accumulation, or "stack-up", of individual part tolerances to permit alignment of the connector ends with corresponding receptacles for the motor and electronic control module.

The present invention contemplates an internal electrical connector for a hydraulic control unit which includes a connector body having a first end and a second end opposite from the first end. The connector body is adapted to extend through a bore formed in a hydraulic control unit valve body with the connector body movable within the bore. The connector also includes at least one electrical conductor extending along the connector body with the ends of the electrical conductor extending axially beyond the ends of the connector body. It is further contemplated that the conductor can move both transversely and axially within the valve body bore.

The connector also includes a retaining device which secures the connector body within the valve body bore. In the preferred embodiment, the retaining device includes a shoulder extending from the connector body near the first end of the connector body and at least one resilient barb extending from the connector body near the second end thereof.

The invention further contemplates a hydraulic control unit including a valve body having at least one solenoid valve disposed therein. The valve body defines a first surface and second surface opposite from the first surface. The valve body also has bore extending therethrough between the first and second surfaces. An electronic control unit is mounted upon the first surface of the valve body and a motor is mounted upon the second surface of the valve body. An internal electrical connector having a first end and a second end opposite from the first end extends through the valve body bore with the connector movable within the bore. The electrical connector includes a body portion and at least one electrical conductor which extends axially along the body portion. The electrical conductor has a first end which extends axially beyond the first end of the connector body portion. The first end of the electrical conductor is electrically connected to the electronic control unit. The electrical conductor also has a second end which extends axially beyond the second end of the connector body. The second end of the electrical conductor is electrically connected to the pump motor.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
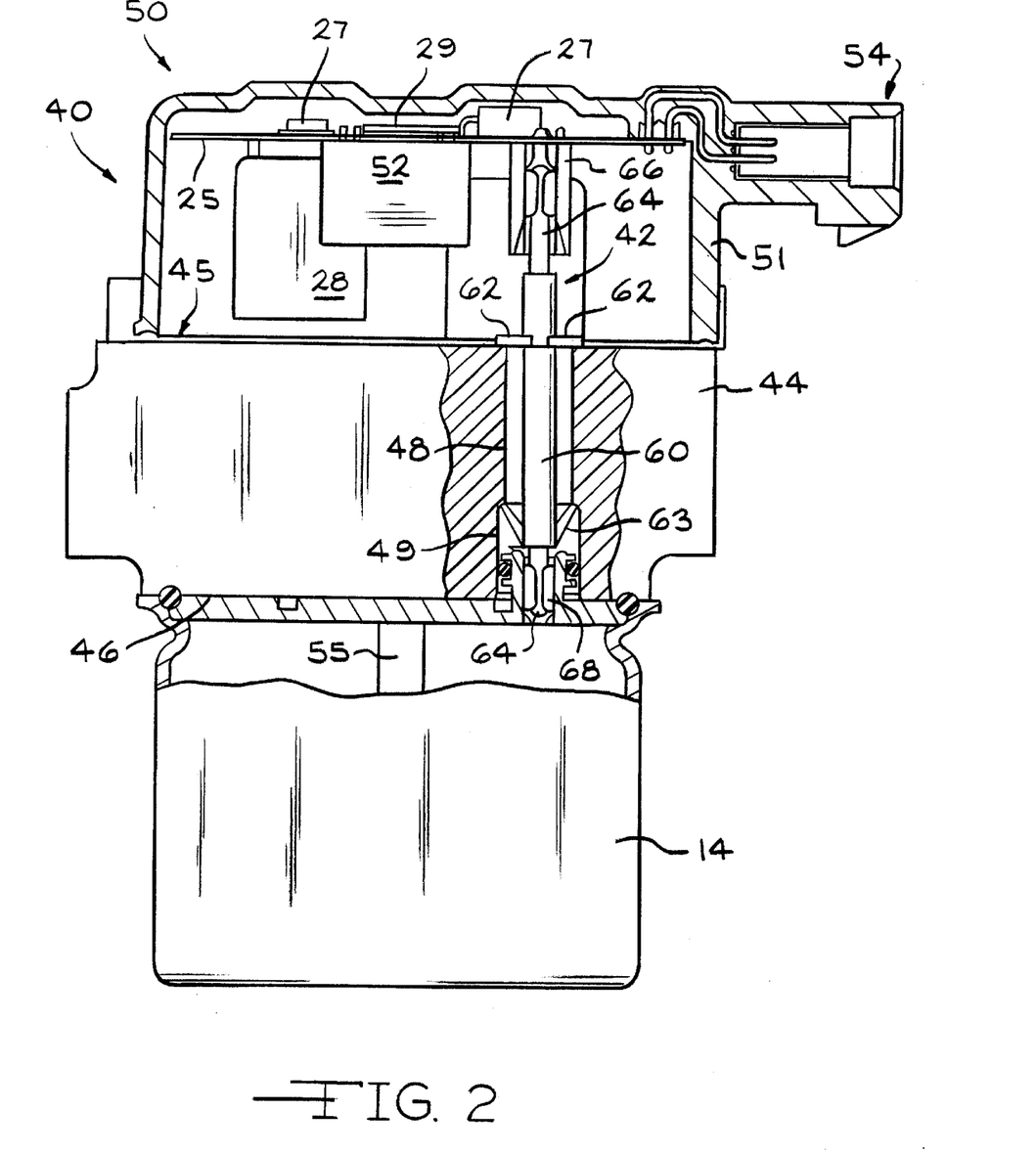
FIG 2. is partial sectional view of an ABS hydraulic control unit in accordance with the Present invention.

Referring again to the drawings, there is illustrated in FIG. 2, an improved ABS hydraulic control unit 40 which includes an internal electrical connector 42 in accordance with the present invention. Components illustrated in FIG. 2 which are similar to components shown in FIG. 1 have the same numerical designators.

The hydraulic control unit 40 includes a control valve body 44 having a top surface 45 and a bottom surface 46. It will be appreciated that references to "top", "bottom", "upper", "lower" and "side" in the following description are relative to the figures and are not meant to be restrictive as to orientation of the invention. For simplicity, the ports formed in the valve body 44 which communicate with the vehicle hydraulic brake system have been omitted from FIG. 2. A bore 48 extends through the valve body 44 between the top and bottom surfaces 45 and 46. As shown in FIG. 2, the lower end of the bore 48 terminates in a counterbored portion 49 having a larger diameter. It will be appreciated that the invention also can be practiced with the counterbored portion 49 formed at the upper end of the bore 48 (not shown). As shown in FIG. 2, the lower end of the counterbored portion 49 is covered by the end of a pump motor 14.

An Electronic Control Unit (ECU) 50 having a one piece housing 51 is secured to the top surface 45 of the control valve 44 and covers the upper end of the bore 48. The ECU 50 can be attached to the control valve 44 by any conventional means, such as with a plurality of threaded fasteners (not shown). A Printed Circuit Board (PCB) 25 is disposed within the housing 51. As described above, electronic components 27 are mounted upon the upper surface of the PCB 25 while a plurality of solenoid coils 28 are mounted upon the lower surface thereof. In the preferred embodiment, the electronic components include a microprocessor 29 for controlling the ABS. Alternately, the electronic components can be located separately, in which case only the PCB 25 and solenoid coils 28 would be disposed within the housing 51. When only the solenoid coils 28 are included in the housing 51, the unit is commonly referred to as a Coil Integrated Module (CIM) (not shown). Also shown in FIG. 2 is a relay 52 which is mounted upon the lower surface of the PCB 25. The relay 52 closes upon activation of the ABS and thereby supplies electrical power to actuate the pump motor 14 and the solenoid coils 28. Traces of electrically conductive material (not shown) deposited upon the upper surface of the PCB 25 connect the components mounted thereon to an electrical connector 54. The electrical connector 54 provides a connection to the ABS speed sensors (not shown) and the vehicle power supply (not shown). The electrical connector 54 also can provide an interface to other vehicle control systems, such as an engine controller microprocessor.

The electric pump motor 14 is mounted upon the bottom surface 46 of the valve body 44. The motor 14 has a motor shaft 55 which extends into the valve body 44 to drive a pump (not shown) contained therein. By locating the pump motor 14 below the valve body 44, the overall size of the hydraulic control unit 40 is reduced.

Figure 3:
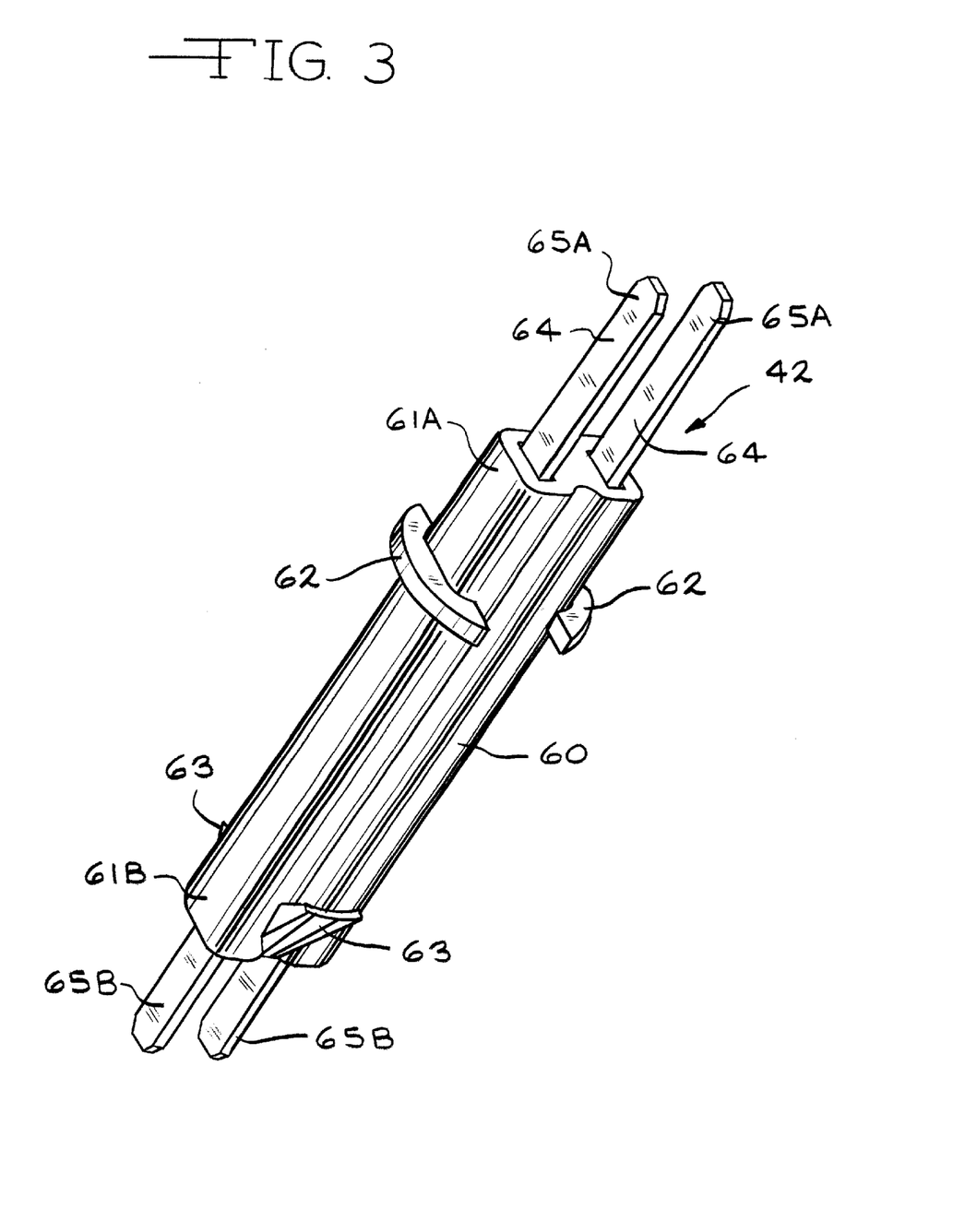
FIG 3. is perspective view of an internal electrical connector included in the hydraulic cool unit shown in FIG. 2.

The present invention contemplates an internal electrical connector 42 for supplying electric power from the PCB 25 in the ECU 50 to the pump motor 14. As shown in FIG. 2, the internal connector 42 extends through the bore 48 formed in the valve body 44. As best seen in FIG. 3, the internal connector 42 includes a body portion 60 formed from an electrically non—conductive material, which, in the preferred embodiment is a plastic. The body 60 includes a first end 61A and a second end 61B that is opposite the first end 61A. While the body portion 60 is illustrated in FIG. 3 as having a generally rectangular cross section, it will be appreciated that the body portion 60 also can be formed having other cross sectional shapes, such as a circle, oval or polygon. For reasons which will be given below, the body portion 60 is sized to be smaller than the diameter of the valve body bore 48 so that the connector 42 can move transversely within the bore 48.

A pair of shoulders 62 are formed near a first end of the connector body portion 60 and extend perpendicularly from the body portion 60. As shown in FIG. 3, the shoulders 62 have an arcuate shape; however, the invention also can be practiced with shoulders 62 having a different shapes. Alternately, a flange (not shown) can be formed upon the body portion 60. A pair of resilient barbs 63 are formed at a second end of the body portion 60 opposite from the shoulders 62. The barbs 63 extend outward from the body portion 60 and toward the shoulders 62. Thus, the barbs 53 form an acute angle with the body portion 60. The distance between the shoulders 62 and the ends of the barbs 63 corresponds to a bore vertical distance between the top surface 45 of the valve body 44 and the upper end of the counterbore 49. In the preferred embodiment, the distance between the shoulders 62 and the ends of the barbs 63 is greater than the bore vertical distance to allow axial movement of the connector 42 within the bore 48. As will be explained below, the shoulders 62 and barbs 63 cooperate with the valve body to retain the connector 42 within the valve body bore 48.

A pair of electrical conductors 64 extend axially through the connector body portion 60. In the preferred embodiment, each of the electrical conductors 64 is formed from a strip of electrically conductive material, such as copper. Each of the conductors 64 includes a first end 65A and a second end 65B that is opposite the first end 65A. The conductors 64 have a sufficient structural stiffness that the conductor ends can function as male blade electrical connectors. The ends of the conductors 64 extend beyond the ends of the body portion 60 and are beveled to facilitate forming an electrical connection with the PCB 25 and the motor 14. Also in the preferred embodiment, the body portion 60 is overmolded upon the conductors 64. However, the conductors 64 can be inserted into corresponding axial slots or apertures formed in a preformed body portion (not shown). While a pair of conductors 64 are illustrated in FIG. 3, it will be appreciated that the connector 42 can carry more or less conductors 64. For example, if an electrical return path is provided though the motor housing and valve body 44, only one conductor 64 (not shown) would be needed. Similarly, the invention also contemplates including electronic components within the motor housing, which would require additional conductors 64 for connecting such components to the PCB 25.

During assembly of the hydraulic control unit 40, the barbed end of the connector 42 is inserted into the upper end of the valve body bore 48. The walls of the bore 48 compress the barbs against the connector body portion 60 of the connector 42. Upon reaching the counterbored portion 49, the resiliency of the material forming the barbs 63 causes the barbs 63 to extend outward from the body portion 60. The shoulders 62 engage the top surface 45 of the valve body 44 to prevent further travel into the bore 48. Thus, the shoulders 62 and the barbs 63 co-operate with the valve body surface 45 and the couterbore 49 to secure the connector 42 within the valve body bore 48. However, because the body portion 60 has a cross section which is smaller than the diameter of the bore 48, the connector 42 is free to move transversely within the bore 48. Additionally, depending upon the spacing between the shoulders 62 and the barbs 63, the connector 42 also can be free to move a small distance axially within the bore 48. As indicated above, the counterbore 49 can alternately be formed in the top surface of the valve body 44, in which case the connector 42 is inserted from below. Additionally, the counterbore 49 can be omitted, with the shoulders 62 and barbs 63 cooperating with the top and bottom surfaces 45 and 46, respectively, to retain the conductor 42 within the bore 48 (not shown).

As best seen in FIG. 2, when the connector 42 is disposed within the bore, an end of the body portion 60 extends above the top surface 45 of the valve body 44 to carry the ends of the conductors 64 to corresponding female blade connectors 66 which are mounted upon the lower surface of the PCB 25. When the ECU 50 is mounted upon the top surface 45 of the valve body 44, the upper ends of the conductors 64 are slidingly received by the female blade connectors 66 mounted upon the PCB 25 to form an electrical connection therewith. As also best seen in FIG. 2, the lower ends of the conductors 64 are disposed within the counterbore 49. The counterbore 49 receives female blade connectors 68 which extend from the end of the pump motor 14. The lower ends of the conductors 64 are slidingly received by the female blade connectors 68 to form an electrical connection with the motor 14 and any electronic components which may be disposed within the motor housing. Because the connector 42 is free to move transversely and axially within the bore, any stack up tolerances of the motor components or the ECU components are compensated for and the electrical connection is completed.

While the preferred embodiment of the invention has been illustrated and described above as having the ends of the connector conductors formed into blade connectors, it will be appreciated that the invention also can be practiced with the conductor ends formed into other conventional or non-conventional electrical connectors.

The present invention provides a number of advantages. The internal electrical connector 42 is easier to install than the prior art motor pigtail connector 15. The relocation of the motor 14 to the bottom surface 46 of the valve body 44 reduces the overall size of the hydraulic control unit 40. The internal connector 42 is protected from a potentially harsh operating environment and compensates for stack up tolerances of the electrical components being connected.

Figure 4:
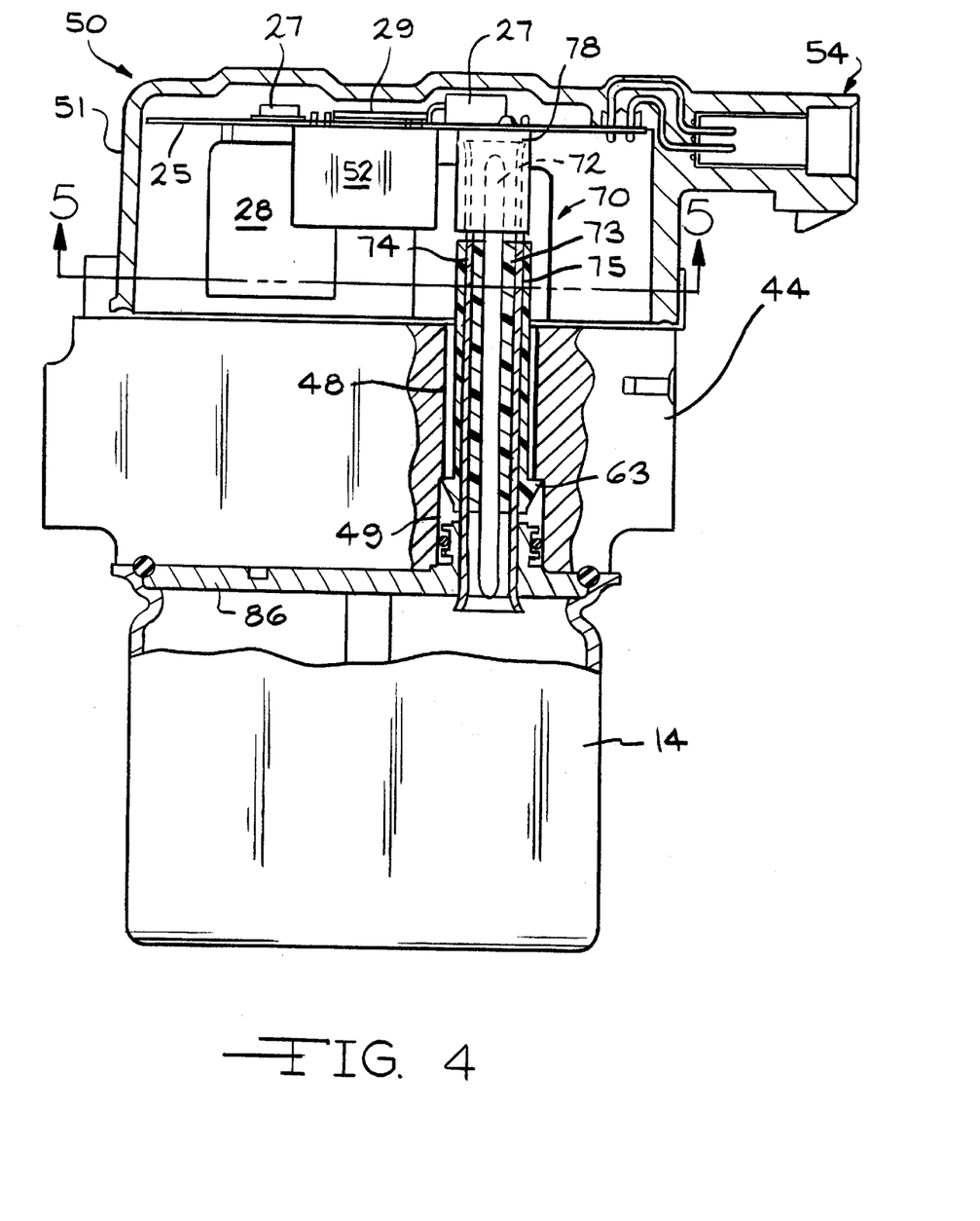
FIG 4. is partial sectional view of an ABS hydraulic control unit show in FIG. 2 which illustrates an alternate embodiment of the present invention.

An alternate embodiment of the connector is shown generally at 70 in FIG. 4. Components shown in FIG. 4 which are similar to components shown in FIG. 2 have the same numerical designators. The connector 70 includes a center conductor 72 that is overmolded by an inner sleeve 73 of electrically non-conductive material, such as a plastic. A cylindrical outer conductor 74 is formed over the outer surface of the inner sleeve 73. An outer sleeve 75 of electrically non-conductive material is formed over the outer surface of the outer conductor 74. In the preferred embodiment, the diameter of the outer sleeve 75 is less than the diameter of the bore 48 formed through the valve body 11 to allow transverse movement of the connector 74 within the bore 48.

Figure 5:
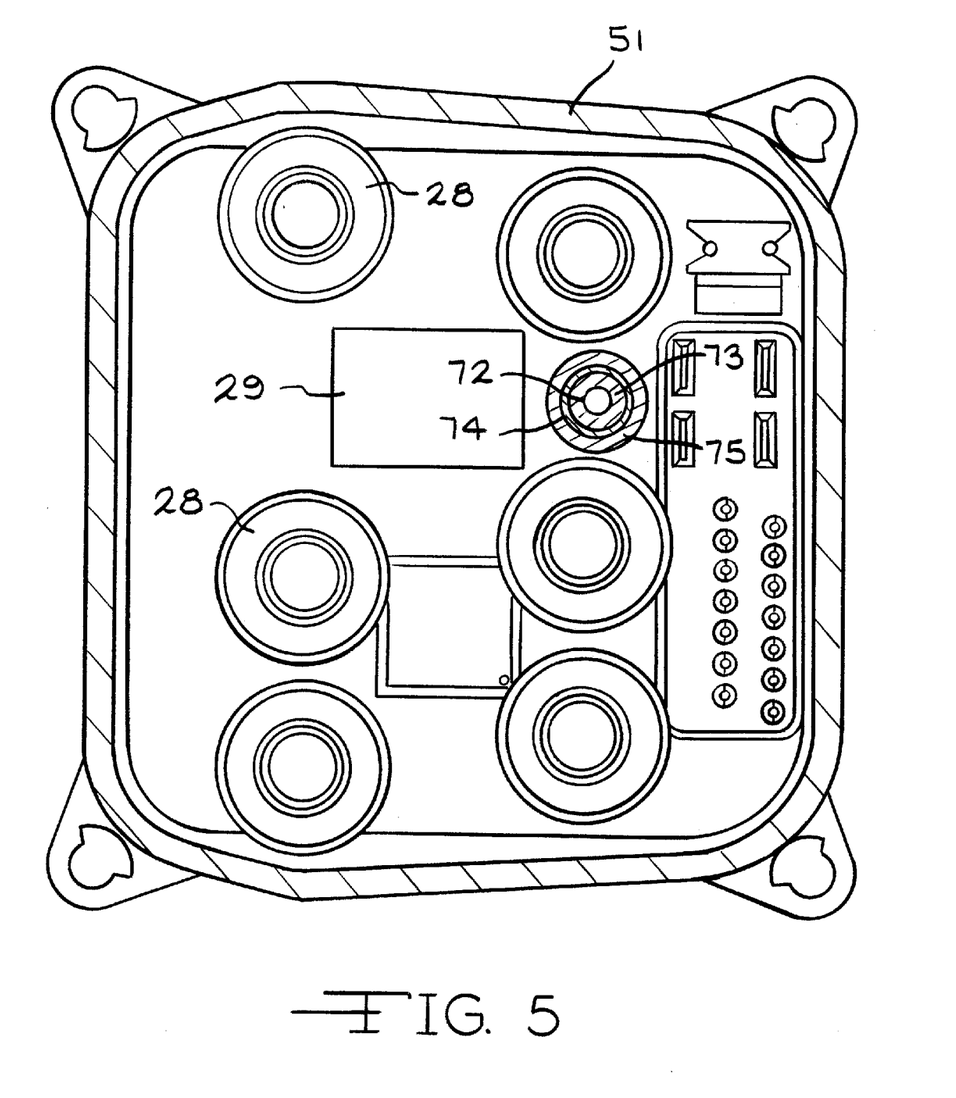
FIG 5. is a sectional view taken along line 5—5 in FIG. 4.

As shown in FIG. 4, the ends of the outer conductor 74 flare outwardly while the ends of the center conductor 72 are tapered. Additionally, a plurality of axially extending slots (not shown) may be formed in the ends of the outer conductor 74. Both ends of the center and outer conductors 72 and 74 extend beyond the ends of the inner and outer sleeves 73 and 74. Similar to the connector 60 described above, a plurality of barbs 63 extend from the lower end of the outer sleeve 75. It is further contemplated that shoulders or a flange can be formed upon the upper end of the outer sleeve 75; however, such shoulders or flange are not shown in FIG. 4. As best seen in FIG. 5, the center and outer conductors 72 and 74 cooperate to form a coaxial connector. While two conductors are illustrated in FIGS. 4 and 5, it will be appreciated that the coaxial connector 70 can include more or less conductors.

As described above, the coaxial connector 70 is inserted into the bore 48 formed through the valve body 44. The barbs 63 cooperate with the counter bore 49 to retain the connector 70 within the bore 48. The upper end of the connector 70 is received by a coaxial receptacle 78 mounted upon the lower surface of the PCB 25. Similarly, the lower end of the connector 70 is received by a coaxial receptacle (not shown) mounted upon a motor end flange 80.

Because the coaxial connector 70 includes circular connectors, only one point on the circle needs to make contact to establish an electrical connection. Additionally, slots formed in the ends of the outer conductor 74 form resilient fingers which further enhance forming an electrical connection. Accordingly, the coaxial connector 70 can be displaced transversely and axially within the bore 48 to accommodate the stack-up of part tolerances as an assembly aid. Assembly is further enhanced as it is not necessary to orient the connector relative to the receptacles, as is the case when blade connectors are utilized. Furthermore, the outer conductor 74 can be connected to ground to form a shield for the center conductor 72 and thereby form a shield for the center conductor 72 from EMI or EMC radiation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described for an anti-lock brake system, it will be appreciated that the invention also can be practiced with other systems, such as traction control and vehicle stability systems.

What is claimed is:

1. An electrical connector for a hydraulic control unit comprising:
   a connector body having a cross section, said connector body also having a first end and a second end opposite from said first end, said connector body adapted to extend through a bore formed in a hydraulic control unit valve body, said bore in said hydraulic control valve body having a cross section, said connector body cross section being smaller than said hydraulic valve body bore cross section such that said connector body is movable in a transverse direction relative to said bore; and
   at least one electrical conductor extending axially along said connector body, said electrical conductor having a first end and a second end opposite from said first end with said first and second conductor ends extending axially beyond said first and second ends of said connector body.

2. An electrical connector according to claim 1 wherein the connector is adapted to move axially within said valve body bore.

3. An electrical connector according to claim 1, wherein said at least one electrical conductor is one of a plurality of electrical conductors extending axially along said connector body, each of said electrical conductors extending from said ends of said connector body.

4. An electrical connector according to claim 3 wherein said electrical conductors have ends which are formed into electrical connections.

5. An electrical connector according to claim 4 wherein said connector body includes a retaining device which secures said connector body within said valve body bore.

6. An electrical connector according to claim 5 wherein said retaining device includes a shoulder extending from said connector body near said first end and at least one resilient barb extending from said connector body near said second end, said shoulder co-operating with an end of said valve body bore to limit the extension of said connector body into said valve body bore.

7. An electrical connector according to claim 6, wherein said at least one resilient barb is one of a plurality of barbs extending from said connector body.

8. An electrical connector according to claim 7 wherein said connector body is formed from a plastic which is overmolded over said electrical conductor.

9. An electrical connector according to claim 7 wherein said connector body is formed from a plastic, said connector body having an axially extending opening formed therethrough and further wherein said electrical conductor extends through said axial opening.

10. An electrical connector for a hydraulic control unit comprising:
    a connector body having a first end and a second end opposite from said first end, said connector body adapted to extend through a bore formed in a hydraulic control unit valve body with said connector body movable within said bore; and
    at least two electrical conductors extending axially along said connector body, said electrical conductors having first ends and second ends opposite from said first ends with said first and second conductor ends extending axially beyond said first and second ends of said connector body, said electrical conductors including at least a cylindrical central conductor received by a conductive sleeve forming an outer conductor with an electrically insulative material disposed between said central conductor and outer conductor to form a coaxial connector.

11. An electrical connector according to claim 10 wherein an outer sleeve of electrically insulative material is formed over at least a portion of the outer surface of said outer conductor.

12. An electrical connector according to claim 11 wherein the ends of said outer conductor are flared.

13. An electrical connector according to claim 12 wherein a plurality of axially extending slots are formed in the ends of said outer conductor, said slots defining resilient fingers.

14. A hydraulic control unit comprising:
    a valve body having a first surface and a second surface opposite from said first surface, said valve body further having a bore extending therethrough between said first and second surfaces, said bore having a cross section;
    an electronic control unit mounted upon said first surface of said valve body;
    a pump motor mounted upon said second surface of said valve body;
    a connector body having a cross section, said connector body also having a first end and a second end opposite from said first end, said connector body extending axially through said bore formed in said valve body, said bore in said hydraulic control valve body having a cross section, said connector body cross section being smaller than said hydraulic valve body bore cross section such that said connector body is movable in a transverse direction relative to said bore; and
    at least one electrical conductor extending axially along said connector body to form an electrical connector, said electrical conductor having a first end extending axially beyond said first end of said connector body, said first end of said electrical conductor being electrically connected to said electronic control unit, said electrical conductor also having a second end extending axially beyond said second end of said connector body, said second end of said electrical conductor being connected to said pump motor.

15. A hydraulic control unit according to claim 14 wherein said electrical connector is movable axially within said valve body bore.

16. A hydraulic control unit according to claim 14 further including a plurality of electrical conductors extending axially along said connector body, each of said electrical conductors extending from said ends of said connector body to form electrical connections with said electronic control unit and said pump motor.

17. A hydraulic control unit according to claim 16 wherein said electrical conductors have ends which are formed into electrical connectors.

18. A hydraulic control unit comprising:
   a valve body having a first surface and a second surface opposite from said first surface, said valve body further having a bore extending therethrough between said first and second surfaces;
   an electronic control unit mounted upon said first surface of said valve body;
   a pump motor mounted upon said second surface of said valve body;
   a connector body having a first end and a second end opposite from said first end, said connector body extending axially through said bore formed in said valve body with said connector body movable within said bore; and
   at least two electrical conductors extending axially along said connector body to form an electrical connector, said electrical conductors having first ends extending axially beyond said first end of said connector body, said first ends of said electrical conductors being electrically connected to said electronic control unit, said electrical conductors also having second ends extending axially beyond said second end of said connector body, said second ends of said electrical conductors being connected to said pump motor, said electrical conductors including at least a cylindrical central conductor received by a conductive sleeve forming an outer conductor with an electrically insulative material disposed between said central conductor and outer conductor to form a coaxial connector.

19. A hydraulic control unit according to claim 18 wherein an outer sleeve of electrically insulative material is formed over at least a portion of the outer surface of said outer conductor.

20. A hydraulic control unit according to claim 18 wherein said connector body includes a retaining device which secures said connector body within said valve body bore.

21. A hydraulic control unit according to claim 20 wherein said retaining device includes a shoulder extending from said connector body near said first end and at least one resilient barb extending from said connector body near said second end, said shoulder cooperating with said first valve body surface and said barb cooperating with said second valve body surface to retain said connector body within said valve body bore.

22. A hydraulic control unit according to claim 21 further including a plurality of barbs extending from said connector body.

23. A hydraulic control unit according to claim 22 wherein said valve body bore includes a counterbored portion, said counterbored portion receiving said barbs.

24. A hydraulic control unit according to claim 22 wherein said connector body is formed from a plastic which is overmolded over said electrical conductor.

25. An electrical connector according to claim 22 wherein said connector body is formed from a plastic, said connector body having an axially extending opening formed therethrough and further wherein said electrical conductor extends through said axial opening.

26. A hydraulic control unit according to claim 22 wherein the hydraulic control unit is included in an anti-lock brake control system.

27. A hydraulic control unit according to claim 22 wherein the hydraulic control unit is included in a traction control system.

28. A hydraulic control unit according to claim 22 wherein the hydraulic control unit is included in a vehicle stability control system.

* * * * *